United States Patent
Atherley (10) Patent No.: US 8,127,751 B2
(45) Date of Patent: Mar. 6, 2012

(54) NITROUS OXIDE/METHANOL INJECTION SYSTEM

(76) Inventor: James Atherley, Pleasant Grove, UT (US)

( * ) Notice: Subject to any disclaimer, the term of this patent is extended or adjusted under 35 U.S.C. 154(b) by 576 days.

(21) Appl. No.: 12/331,615

(22) Filed: Dec. 10, 2008

(65) Prior Publication Data

US 2010/0139636 A1    Jun. 10, 2010

Related U.S. Application Data

(63) Continuation-in-part of application No. 12/250,928, filed on Oct. 14, 2008, now Pat. No. 8,020,542.

(51) Int. Cl.
*F02M 69/08* (2006.01)
*F02B 75/12* (2006.01)
*F02B 23/00* (2006.01)

(52) U.S. Cl. ........................ 123/585; 123/445
(58) Field of Classification Search ............. 123/1 A, 123/575, 585, 531, 586–588, 445
See application file for complete search history.

(56) References Cited

U.S. PATENT DOCUMENTS

| | | | |
|---|---|---|---|
| 1,260,487 A | 3/1918 | Vincent | |
| 1,843,410 A | 2/1932 | Von Salis | |
| 2,471,605 A | 5/1949 | Broeze | |
| 2,603,557 A * | 7/1952 | Roush | 44/374 |
| 2,984,254 A | 5/1961 | Herbert | |
| 3,145,056 A | 8/1964 | Blahnik | |
| 3,315,701 A | 4/1967 | Stilwell | |
| 3,528,523 A | 9/1970 | Thorner | |
| 4,385,489 A | 5/1983 | Abbott | |
| 4,474,175 A | 10/1984 | Hudimac, Jr. | |
| 4,494,488 A | 1/1985 | Wheatley | |
| 4,683,843 A | 8/1987 | Norcia et al. | |
| 4,798,190 A | 1/1989 | Vaznaian et al. | |
| 5,287,281 A | 2/1994 | Meaney | |
| 5,411,053 A | 5/1995 | Markham et al. | |
| 5,522,421 A | 6/1996 | Holt et al. | |
| 5,699,776 A * | 12/1997 | Wood et al. | 123/585 |
| 5,921,765 A | 7/1999 | Smith | |
| 5,967,099 A | 10/1999 | Patrick | |
| 6,105,563 A | 8/2000 | Patrick | |
| 6,260,546 B1 | 7/2001 | Vaughn | |
| 6,453,894 B1 | 9/2002 | Fischer et al. | |
| 6,523,530 B2 | 2/2003 | Evert et al. | |

(Continued)

OTHER PUBLICATIONS

Ice Nitrous Systems, "Products & Accessories" Snowmobiles, pp. 1-2.

(Continued)

*Primary Examiner* — Noah Kamen
(74) *Attorney, Agent, or Firm* — Thorpe North & Western LLP (57) ABSTRACT

A nitrous oxide system for an internal combustion engine includes a bottle containing pressurized nitrous oxide coupled to a nitrous oxide flow line, which is in fluid communication with an injection nozzle operatively coupled to the engine intake. A control valve is fluidly coupled to the nitrous oxide flow line between the nitrous oxide bottle and the injection nozzle, and is operable to control the flow of nitrous oxide through the nitrous oxide flow line to the engine intake. A methanol injection line is in fluid communication with a source of supplemental methanol, and a methanol valve is fluidly coupled to the methanol injection line and operably coupled to the nitrous oxide flow line, such that a flow of pressurized nitrous oxide through the nitrous oxide flow line opens the methanol valve to allow a flow of supplemental methanol to the engine intake.

25 Claims, 5 Drawing Sheets

U.S. PATENT DOCUMENTS

| | | | |
|---|---|---|---|
| 6,758,198 | B1 | 7/2004 | Suhre et al. |
| 6,938,841 | B2 | 9/2005 | Holtzman |
| 6,955,160 | B1 | 10/2005 | Konopacki et al. |
| 7,082,933 | B1 | 8/2006 | Holtzman |
| 7,451,751 | B2 | 11/2008 | Atherley |
| 2003/0062428 | A1 | 4/2003 | Baasch et al. |
| 2004/0025832 | A1 | 2/2004 | Baasch et al. |
| 2004/0084032 | A1 | 5/2004 | Baasch et al. |
| 2004/0139950 | A1 | 7/2004 | Flynn et al. |
| 2004/0250804 | A1 | 12/2004 | Young |
| 2005/0001074 | A1 | 1/2005 | Holtzman |
| 2006/0037591 | A1 | 2/2006 | Ferguson |
| 2006/0254567 | A1 | 11/2006 | Holtzman |

OTHER PUBLICATIONS

"PCT (Pressure Control Technology) Nitrous" www.holtzmaneng.com, 1 page.

"Nitrous Oxide" www.snowtechmagazine.com/articles/nitrous/nitrous.html Dec. 8, 2004, pp. 1-6.

NOS Nitrous Oxide, A Division of Holley Performance, "Nos A Holley Performance Brand" www.holley.com/HiOctn/NewsInfo/NewsRels/NewsRels.html 1 page.

NOS Nitrous Oxide Systems History, www.holley.com/HiOctn/ProdLine/Products/NOS/GenInfo/History.html, Dec. 8, 2004, pp. 1-3.

Nitrous Oxide Technical Information, Nitrous Oxide General & Technical Information, Types of NOS Systems www.holley.com/HiOctn/TechServ/TechInfo/NOSTech1.html, Dec. 8, 2004, pg.

Nitrous Oxide Technical Information, "Nitrous Oxide General & Technical Information, System Overview & Technical Info" www.holley.com/HiOctn/TechServ/TechInfo/NOSTech2.html.

NOS. Nitrous Oxide Systems, "Power Sports Nitrous System" www.holley.com/HiOctnlProdLine/Products/NOS/NOSPS/SnowFog.html, Dec. 8, 2004, pp, 1-3.

Atherley, James, U.S. Appl. No. 12/251,051, filed Oct. 14, 2008.

Atherley, James, U.S. Appl. No. 12/250,928, filed Dec. 14, 2008.

Atherley, James, U.S. Appl. No. 12/331,609, filed Dec. 10, 2008.

Atherley, James, U.S. Appl. No. 12/251,121, filed Dec. 14, 2008.

U.S. Appl. 12/250,928, filed Oct. 14, 2008; James Atherley; office action issued Jan. 26, 2011.

U.S. Appl. 12/250,928, filed Oct. 14, 2008; James Atherley; Notice of Allowance issued May 20, 2011.

U.S. Appl. No. 12/331,609, filed Dec. 10, 2008; Kent Carroll; office action issued Sep. 20, 2011.

\* cited by examiner

NITROUS OXIDE/METHANOL INJECTION SYSTEM

PRIORITY CLAIM

This application is a continuation-in-part of U.S. patent application Ser. No. 12/250,928, filed Oct. 14, 2008, and entitled "Nitrous Oxide Injection System", now U.S. Pat. No. 8,020,542, which application is incorporated by reference in its entirety herein.

RELATED APPLICATIONS

This application is related to U.S. Pat. No. 7,451,751; U.S. patent application Ser. No. 12/251,051, filed Oct. 14, 2008, now U.S. Pat. No. 7,699,043; U.S. patent application Ser. No. 12/250,928; filed Oct. 14, 2008, now U.S. Pat. No. 8,020,542; U.S. patent application Ser. No. 12/251,121, filed Oct. 14, 2008, now abandoned; and U.S. patent application Ser. No. 12/331,609, filed Dec. 10, 2008; which are herein incorporated by reference.

FIELD OF THE INVENTION

The present invention relates generally to a nitrous oxide injection system for an internal combustion engine, and more specifically to a nitrous oxide injection system for a gasoline or diesel internal combustion engine powering a recreational vehicle.

BACKGROUND OF THE INVENTION AND RELATED ART

Nitrous oxide systems (NOS) for vehicles are designed to temporarily boost the power output of internal combustion gas engines. Such a system injects vaporized nitrous oxide into the intake of a gasoline engine to allow for a more energetic combustion stroke than would otherwise be available during normal operation, with greater power being transferred back to the piston and drive shaft with an ultimate increase in the horsepower output of the engine. The nitrous oxide is typically stored as a compressed liquid inside a pressurized bottle which is allowed to flash into a vapor upon release into the engine intake.

Similarly, water/methanol systems are designed to temporarily boost the power output of internal combustion diesel engines. Such a system injects a water/methanol mixture into the intake of a diesel engine. A liquid pump is used to inject the mixture of water/methanol into the intake system.

While both types of injection systems are designed to temporarily boost the power output of internal combustion engines, the two processes are generally considered to be incompatible, with the water/methanol system lending itself more to diesel engines while NOS injection is more compatible with gasoline engines using spark ignition. The two systems also employ substantially different processes. In the case of a water/methanol injection system, the water's ability to absorb latent heat during evaporation cools the incoming charge of air, creating a denser charge of intake air that contains the extra oxygen for combustion. The methanol acts as an alternative fuel source that can be combined with the extra oxygen to create a more energetic combustion stroke, while at the same time reducing exhaust gas temperatures (EGT). In the case of a NOS injection system, the vaporized nitrous oxide itself contains the additional oxygen that allows extra fuel to also be injected into the combustion chamber, also resulting in a more energetic combustion stroke.

One common characteristic for effective operation of both injection systems, however, is that a balanced air/fuel (or oxidizer/fuel) mixture flowing into the engine should be properly maintained throughout the boost phase. This can be difficult, because a precise increase in fuel or methanol must be provided to balance the additional oxidizer (in the form of vaporized nitrous oxide or a denser charge of intake air), which in turn can be difficult to measure and control.

A frequent problem with nitrous oxide injection systems is that the pressure inside the pressurized bottle can decrease with use and therefore proportionately less nitrous oxide is provided per release valve setting. Compounding the fuel/oxidizer balancing issue is the cooling effect that the compressed nitrous oxide liquid also has on the intake air as it is released into the engine's intake system, reducing the intake air's temperature and increasing its density. While this can provide even more oxidizer (i.e. oxygen) to the engine and enhance the power charging aspects of the nitrous oxide system, it can also upset the delicate balance of oxygen and fuel and can lead to an excessively lean mixture flowing into the combustion chamber.

SUMMARY OF THE INVENTION

In light of the problems and deficiencies inherent in the prior art, the inventor of the present invention has recognized that it would be advantageous to develop a nitrous oxide injection system for an internal combustion engine that allows for the combination of supplemental methanol with pressurized nitrous oxide, and that is activated by the flow of pressurized nitrous oxide into the engine's air/fuel intake system to provide a flow of supplemental methanol in combination with, and correctly proportioned to, the flow of nitrous oxide. The inventor has also recognized that it would be further advantageous if the present invention could be used with both diesel- or gasoline-powered engines.

The present invention provides for a nitrous oxide injection system for an internal combustion engine. The system includes a source of pressurized nitrous oxide, which can be pressurized bottle containing compressed nitrous oxide liquid. A nitrous oxide flow line is coupled between the source of nitrous oxide and an injection nozzle, which is configured to inject nitrous oxide into an engine intake. A control valve is fluidly coupled to the nitrous oxide flow line between the nitrous oxide bottle and the nozzle, being operable to control the flow of nitrous oxide through the flow line and into the engine intake. Additionally, a methanol injection line is configured to be in fluid communication with a source of supplemental methanol and the engine intake, for providing supplemental methanol for injection into the engine intake. A methanol valve is fluidly coupled to the methanol injection line and operably coupled to the nitrous oxide flow line at a point between the control valve and the injection nozzle. The methanol valve is operable to control the flow of supplemental methanol through the methanol injection line to the engine intake when pressurized nitrous oxide is present in the nitrous oxide flow line.

The present invention can also be found in a nitrous oxide injection system that includes an injection nozzle housing having a nitrous oxide inlet port, a methanol inlet port, and a nozzle exit operatively coupled to an engine intake. The injection nozzle housing also contains a methanol valve that is configured to open in response to a flow of pressurized nitrous oxide into the nozzle. The nitrous oxide injection system also includes a nitrous oxide flow line that is in fluid communication with the nitrous oxide inlet port and with a source of pressurized nitrous oxide, and a methanol line that is in fluid communication with the methanol inlet port and with a source of methanol, for providing a flow of supplemental methanol for injection into the engine intake. The nitrous oxide injection system further includes a control valve fluidly coupled to the nitrous oxide flow line between the injection nozzle and the source of pressurized nitrous oxide, and wherein activating the control valve allows the flow of pressurized nitrous oxide into the nozzle to open the methanol valve and combine with the flow of supplemental methanol prior to injection into the internal combustion engine.

The present invention also provides for a method for increasing the power output of an internal combustion engine in response to adding nitrous oxide to an engine intake. The method includes actuating a control valve to allow a flow of pressurized nitrous oxide from a source of pressurized nitrous oxide to enter the engine intake. The method further includes utilizing the pressure from the flow of pressurized nitrous oxide in the flow line to open a methanol valve and allow a flow of supplemental methanol through a methanol injection line to enter the engine intake, to provide a flow of supplemental methanol into the internal combustion engine in addition to the flow of primary fuel.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which.

DETAILED DESCRIPTION OF EXEMPLARY EMBODIMENTS

The following detailed description of the invention makes reference to the accompanying drawings, which form a part thereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the exemplary embodiments of the present invention is not intended to limit the scope of the invention as it is claimed, but is presented for purposes of illustration only: to describe the features and characteristics of the present invention, and to sufficiently enable one skilled in the art to practice the invention. Accordingly, the scope of the present invention is to be defined solely by the appended claims.

The present invention describes a system and method for implementing a nitrous oxide injection system. The embodiments of the present invention described herein generally provide for selectively increasing the performance of an internal combustion engine (such as gasoline, diesel, liquid petroleum or compressed natural gas fueled) and/or providing a power boost to such an engine. Snowmobiles, All-Terrain Vehicles (ATVs), motorcycles, automobiles, semi-trucks, riding lawnmowers and tractors are examples of vehicles that can benefit from the use of nitrous oxide systems.

The nitrous oxide system can include a pressurized nitrous oxide source, such as a pressure vessel or bottle filled with compressed nitrous oxide liquid. A nitrous oxide flow line can deliver the pressurized nitrous oxide from the source to an injection nozzle, which can inject the nitrous oxide into an intake of the engine where the nitrous oxide can combine with the intake air for mixing with the vehicle fuel. A control valve can regulate the flow of pressurized fluid through the nitrous oxide flow line. The system can further include a methanol injection line extending between a methanol tank or reservoir and the intake of the engine. The methanol injection line can provide supplemental methanol, which supplements the primary flow of fuel to the engine when nitrous oxide is being delivered to the engine via the nitrous oxide flow line. A methanol valve can be fluidly coupled to the methanol injection line and operably coupled to the nitrous oxide flow line. The methanol valve can thus use nitrous oxide or pressure from the flow of nitrous oxide to open and allow supplemental methanol to flow into the engine.

In one aspect of the present invention, the supplemental methanol can be in liquid form and can be positively pumped to the intake of the engine with a methanol injection pump. In another aspect, the supplemental methanol can be drawn to the engine intake via a low pressure suction means. Furthermore, the supplemental methanol can comprise substantially pure methanol, a mixture of methanol and water, up to and including a 50/50 mixture of methanol and water, or a mixture of methanol, water and oil.

In one exemplary embodiment of the present invention, the methanol valve and the nitrous oxide control valve can be disposed in a single box that can be disposed in an engine compartment, with separate flow lines and entry points to the engine intake for both the nitrous oxide and the supplemental methanol. Having separate entry points for the supplemental methanol and oxidizer can provide for more flexibility in configuring the engine for optimal installation and performance. The nitrous oxide can be directed into the intake side of the engine. For instance, it may be beneficial to inject the nitrous oxide into an air box or engine intake prior to the carburetor, to allow more time for complete mixing between the nitrous oxide and the intake air and to allow the evaporating nitrous oxide to further cool the intake air before passing into the carburetor. The supplemental methanol can also be injected on the intake the air box or engine intake prior to the carburetor. In other aspects of the present invention, however, it may be desirable to direct the supplemental methanol directly into the carburetor, or downstream of the carburetor, depending upon physical access to the intake system.

In another exemplary embodiment, the methanol valve can be disposed directly within the nitrous oxide injection nozzle, so as to simultaneously mix the supplemental methanol or water/methanol mixture with the pressurized nitrous oxide as it is injected into the engine. This can be advantageous by allowing the pre-mixed methanol and nitrous oxide to be injected downstream of the carburetor, or even directly into the head of the power cylinder, bypassing the engine's standard air/fuel intake system. It may also be beneficial by providing for separate adjustment of the mixing ratio between the nitrous oxide and the supplemental methanol at each injection nozzle.

In another aspect of the present invention, a flow of secondary fuel can be combined with the flow of supplemental methanol prior to delivery into the engine intake. The secondary fuel can be combined with the supplemental methanol at the methanol valve, or at a separate connection point upstream of the methanol valve. Moreover, the system can be further configured so that one or the other, or a controllable proportionate amount of the two liquid fuels, can be mixed together prior to combination with the nitrous oxide.

Each of the above-recited advantages will be apparent in light of the detailed description set forth below and best understood with reference to the accompanying drawings, wherein the elements and features of the invention are designated by numerals throughout. These advantages are not meant to be limiting in any way. Indeed, one skilled in the art will appreciate that other advantages may be realized, other than those specifically recited herein, upon practicing the present invention.

Figure 1:
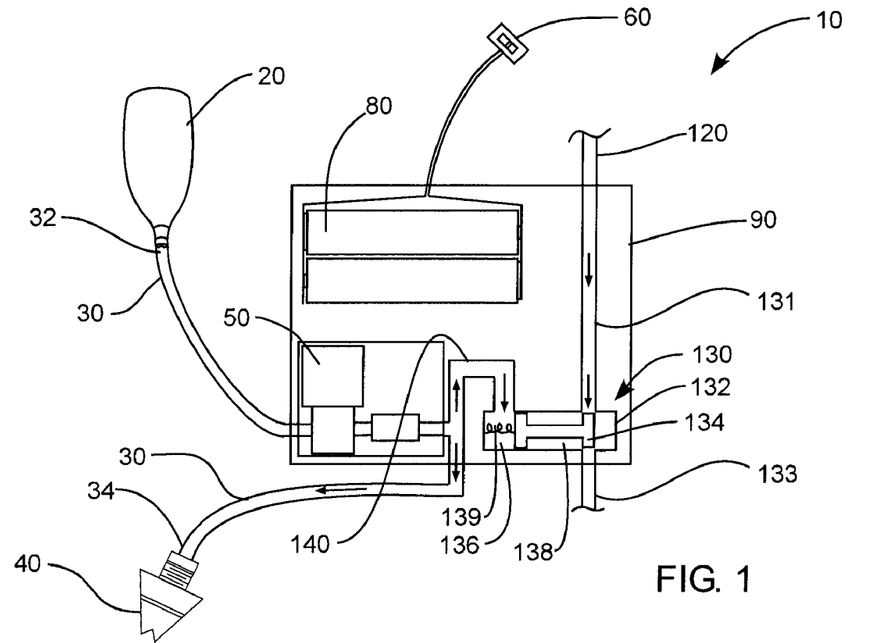
FIG. 1 is a schematic view of a nitrous oxide injection system with a methanol valve in a closed configuration, in accordance with an exemplary embodiment of the present invention.
Figure 2:
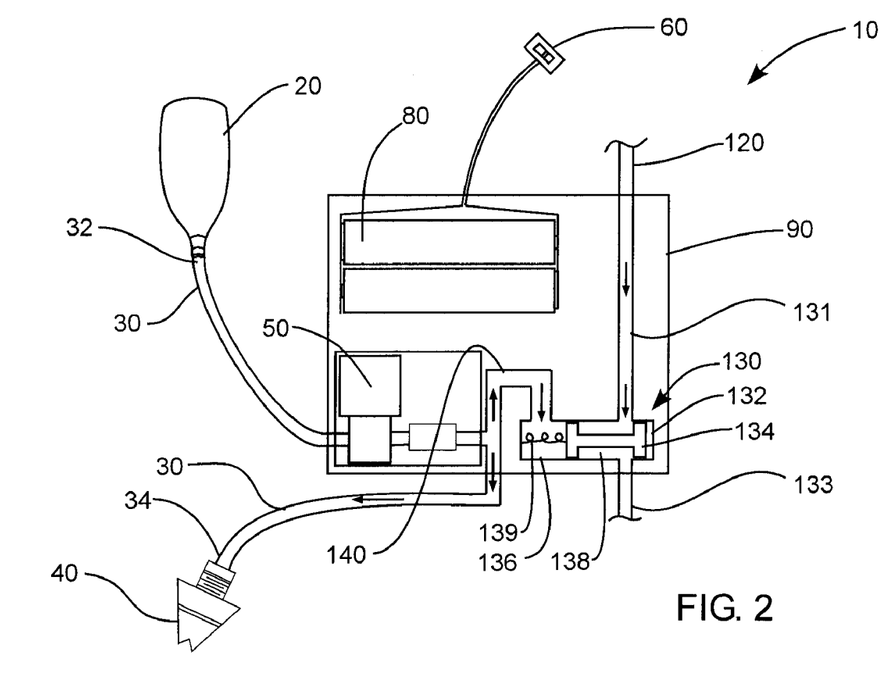
FIG. 2 is a schematic view of the nitrous oxide system of FIG. 1 shown with the methanol valve in an open configuration.

Illustrated in FIGS. 1-2 is a nitrous oxide system 10 in accordance with an exemplary embodiment of the present invention. The nitrous oxide system has a nitrous oxide source, such as a pressurized nitrous oxide bottle 20 configured to contain nitrous oxide under pressure. In one aspect of the present invention, the nitrous oxide bottle 20 can contain compressed nitrous oxide liquid.

A nitrous oxide flow line 30 can have a proximal end 32 coupled to the nitrous oxide bottle. An injection nozzle 40 can be coupled to the distal end 34 of the nitrous oxide flow line. The nozzle 40 can be operatively coupled to an engine intake such as an air-box, or the like. The term "air-box" is used broadly herein to refer to any engine structure upstream of the engine cylinder(s). For example, the air-box can be a filtered air box, a carburetor, fuel injector, and the like. The term "nozzle" is also used broadly herein to refer to means for delivering the nitrous oxide from the nitrous oxide flow line to the engine intake. For example, the nozzle can be a nozzle, an opening in the nitrous oxide flow line, a port, a valve, and the like. The term "line" is used broadly herein to refer to any device that can deliver a fluid from a source to a destination. For example, a line can be a hollow tube, a channel, a hose, a pipe, a path, and the like.

A control valve 50 can be coupled to the nitrous oxide flow line 30 between the nitrous oxide bottle 20 and the injection nozzle 40. The control valve 50 can control release of the nitrous oxide from the bottle to the nozzle. A control switch 60 can be operatively coupled to the control valve 50. The control switch 60 can be mounted on the vehicle, such as by a throttle, to be actuated by a user. Thus, when the user actuates the control switch 60, the control valve 50 opens and allows pressurized nitrous oxide to flow from the bottle to the nozzle and into the engine intake.

Coupling the injection nozzle 40 to an engine intake such as an air box, carburetor inlet, or carburetor outlet allows the nitrous oxide to be injected into the engine. In the present invention, the nitrous oxide can be combined with the intake air prior to being drawn into the carburetor or fuel injector, and mixed with the fuel according to the settings of the carburetor or fuel injector. Alternatively, the nitrous oxide can be introduced into the engine after the fuel is mixed by placing the nozzle downstream from the carburetor. And in yet another aspect of the present invention, the nitrous oxide injection nozzle can be coupled to head of the power cylinder for direct injection in the combustion chamber.

The nitrous oxide bottle 20 can be mounted within or on the structure of the vehicle. If the vehicle is a car or truck, the bottle can be installed a protected enclosure, such as the engine compartment, passenger compartment or trunk. If the vehicle is of a type without large enclosures, such as an ATV or snowmobile, the bottle can also be attached to structures such as a bulkhead, belly pan, hood, side panels steering column and the like. It will be appreciated that the nitrous oxide bottle can be mounted anywhere there is sufficient space, and where the bottle will not interfere with engine operation.

The control valve 50 can control the flow of nitrous oxide flowing through the nitrous oxide flow line 30 to the injection nozzle 40. In one aspect of the invention, the control valve can be a solenoid valve, so that closing the control switch 60 activates the solenoid to open the control valve and allow pressurized nitrous oxide to flow from the bottle to the nozzle and into the engine intake. In other aspects the control valve 50 can also be a flow control valve, a gate valve, a ball valve, a pilot valve, a proportional valve, a globe valve, a check valve, a needle valve, and a stopcock valve, etc.

A battery power source 80, such as batteries, can be electrically coupled to the control valve 50. In one aspect, the battery power source 80 can be free from transfer of electricity with the engine and free from electrical interference from the engine. Specifically, the battery power 80 source can be separate from the battery source and electrical system coupled to the engine. For example, the battery power source 80 for the nitrous oxide system 10 can be simple and inexpensive, such as a plurality of AA size batteries connected in series. Alternatively, in another aspect, the power source can utilize electricity from the vehicle electrical power system. Thus, the nitrous oxide system 10 can have a power source 80 that is independent of the engine or vehicle power source, or a power source that is integrated with the vehicle power source.

The nitrous oxide system 10 can further comprise a methanol injection line 120. The methanol injection line 120 can be coupled to a source of supplemental methanol, such as a methanol tank or reservoir, and can extend through the valve assembly enclosure 90. The methanol injection line 120 can provide supplemental methanol, which acts as a fuel, in addition to the flow of primary fuel which normally powers the engine. In another embodiment, that methanol injection line can be used to provide a secondary source of fuel to the engine, such as gasoline, diesel, and the like.

A methanol valve 130 can be operably coupled to the methanol injection line 120 and the nitrous oxide flow line 30 such that the methanol valve 130 can control the flow of methanol through the methanol injection line 120 to the engine intake when a flow of pressurized nitrous oxide is present in the nitrous oxide flow line 30. Thus, pressure from the flow of pressurized nitrous oxide can open the methanol valve 130.

In the exemplary embodiment of the present invention illustrated in FIGS. 1 and 2, the methanol valve 130 can include a spool-piston type valve having a spool piston 134 disposed inside a cylindrical housing 132. The spool-piston 134 can divide the housing 132 into a nitrous oxide chamber 136 and a methanol chamber 138. The methanol chamber 138 can include a methanol inlet 131 and a methanol outlet 133. The nitrous oxide chamber 136 can be placed in fluid communication with the nitrous oxide flow line 30 via a nitrous oxide side branch 140. Supplemental methanol can enter the methanol chamber 138 from the methanol injection line 120 through the methanol inlet 131 and exit the methanol chamber through the methanol outlet 133. Similarly, nitrous oxide can enter the nitrous oxide chamber through the nitrous oxide side branch 140.

The spool-piston 134 can slide in the outer housing 132 between a closed position, as shown in FIG. 1, and an open position, as shown in FIG. 2. In the closed position, the spool-piston 134 closes the methanol injection line 120 and prevents the methanol or water/methanol mixture from moving through the methanol chamber 138 and to the engine. In the open position, the spool-piston 134 does not block the methanol injection line 120 so that methanol can flow through the methanol valve 130 to the engine intake.

A biasing device 139 can bias the methanol valve 130 to the closed position. For example, the biasing device 139 can be a spring that can be coupled to the spool-piston 134. The spring can bias the spool-piston to the closed position.

A nitrous oxide side-branch 140 can lead off from the nitrous oxide flow line 30 to the methanol valve 130, and can provide nitrous oxide, or pressure from the flow of pressurized nitrous oxide, to the methanol valve 130. Specifically, the nitrous oxide side branch 140 can direct pressurized nitrous oxide from the nitrous oxide flow line into the nitrous oxide chamber 136, where it can be utilized to push the spool-piston 134 to the open position.

Thus, in use, when the control valve 50 is opened pressurized nitrous oxide flows through the nitrous oxide flow line 30, to the injection nozzle 40 which directs the regulated nitrous oxide into the engine intake. At the same time, pressurized nitrous oxide flows through nitrous oxide side branch 140 and into the nitrous oxide chamber 136 of the methanol valve 130. The pressure from the nitrous oxide in the nitrous oxide chamber 136 pushes the spool-piston 134 from the closed position, as shown in FIG. 1, to the open position, as shown in FIG. 2. With the spool piston 134 in the open position, methanol can flow through the methanol injection line 120 to the engine intake. In this way, the nitrous oxide injection system 10 can provide nitrous oxide to the engine along with a corresponding amount of supplemental methanol that can balance the extra oxygen being injected into the engine with the nitrous oxide.

The methanol valve 130 can provide several advantages to the nitrous oxide system 10. For example, the methanol valve eliminates the need for another costly electronic solenoid or other type of electronic valve disposed on the methanol injection line. Additionally, the methanol valve 130 provides a synchronized injection of supplemental methanol along with nitrous oxide into the engine intake, since the methanol valve only opens in response to the presence of pressurized nitrous oxide flowing through the nitrous oxide flow line. Thus, there is no delay or lag between the time the engine receives the nitrous oxide and when the engine receives the supplemental methanol. Similarly, the flows of nitrous oxide and methanol terminate at the same time such that there is no nitrous oxide trail, or excess, residual nitrous oxide left in the engine without a corresponding amount of supplemental methanol. In this way the nitrous oxide system advantageously minimizes lean mixtures of fuel and oxygen due to the singular addition of nitrous oxide into the fuel mix.

In addition, the control valve 50, methanol valve 130, and battery power source 80 can be disposed in a single valve assembly enclosure 90, such as a box or housing, to facilitate installation into a compartment of the engine. The enclosure 90 can include means for attaching the enclosure to structure on the vehicle. For example, the means for attaching can include hook-and-loop type fasteners, adhesives, straps, bolts, and/or brackets, or the like. The structure of the vehicle to which the enclosure can be attached can include the air box, bulkhead, belly pan, hood, side panel, steering column, and the like. Additionally, the nitrous oxide valve, methanol valve, batter power source, box and lines can be a kit that can be used to retrofit an existing gasoline- or diesel-fueled internal combustion engine.

Figure 3:
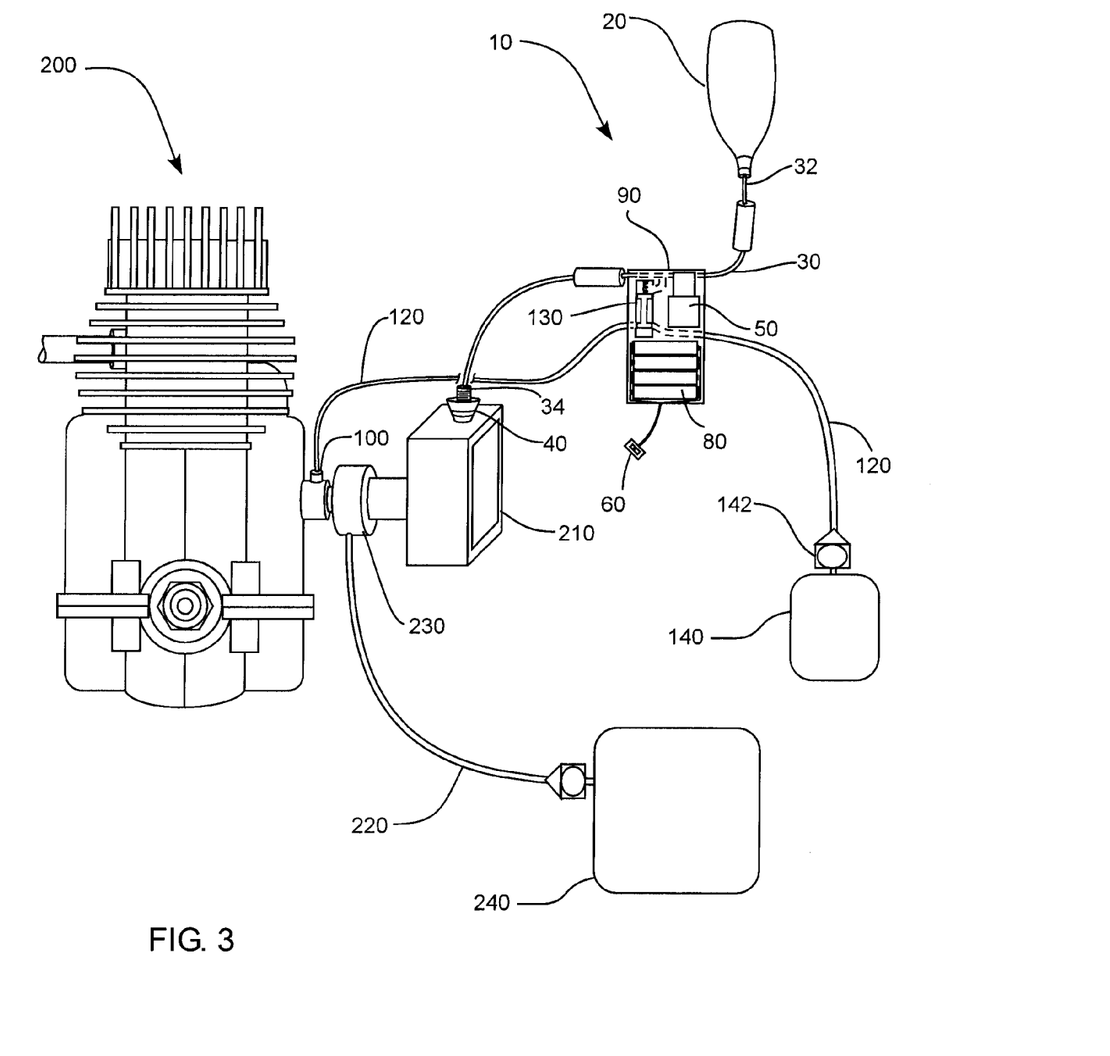
FIG. 3 is a schematic perspective view of a nitrous oxide bottle, methanol tank and fuel tank of the nitrous oxide system of FIG. 1 mounted to an engine.

Illustrated in FIG. 3 is a schematic view of the exemplary embodiment of the nitrous oxide injection system 10 coupled to an engine 200. A nitrous oxide bottle 20 containing pressurized nitrous oxide can be coupled to the proximal end 32 of a nitrous oxide flow line 30. An injection nozzle 40 can be coupled to the distal end 34 of the nitrous oxide flow line, and disposed in an air-box 210. A control valve 50 can be coupled to the nitrous oxide flow line 30 to control the flow of pressurized nitrous oxide from the nitrous oxide bottle to the injection nozzle. A battery power source 80 can be electrically coupled to control valve 50, and a control switch 60 can be operatively coupled to the control valve or battery power source to activate the control valve.

A methanol injection line 120 can be coupled between the engine inlet and a methanol tank or reservoir 140, which can contain liquid methanol or a water/methanol mixture. A methanol valve 130 can be coupled to the methanol injection line 120 to control the flow of supplemental methanol through the line and into the engine inlet. As can be appreciated by one of skill in the art, the nitrous oxide injection nozzle 40 and the outlet 100 from the methanol injection line 120 can be directed to the same location in the engine inlet, or to different locations. For example, the outlet of the methanol injection line can be connected directly to the carburetors 230, or into the air/fuel mixture downstream from the carburetor, as shown.

A methanol injection pump 142 can be used to provide the liquid methanol to the methanol valve 130 at pressure. In another aspect of the invention, the methanol reservoir 140 can be pressurized via another means, such as with a nitrogen-pressurized tank, etc., to provide the liquid methanol to the methanol valve at a constant pressure. The methanol reservoir 140 can be in addition to fuel tank 240 which provides primary fuel to the carburetor 230 via the primary fuel line 220.

A valve assembly enclosure 90 can be disposed about the control valve 50, the methanol valve 130, and the battery power source 80. Advantageously, having the valves 50 and 130 and battery power source 80 contained in the valve assembly enclosure 90 allows for preassembly at the factory of a portion of the nitrous oxide system 10, which reduces installation time and complexity because the user need not assemble many small parts, but instead only needs to splice into the engine air box.

Referring to FIGS. 1-3, a user can activate the control switch 60 when a power boost is required or desired. The control switch 60 provides power from the battery power source 80 to the control valve 50 causing the control valve 50 to open. Pressurized nitrous oxide from the nitrous oxide flow line 30 can flow through the nitrous oxide side branch 140 and into the nitrous oxide chamber 136 of the methanol valve 130, causing the valve to open. As the valves open, correctly proportioned amounts of supplemental methanol and nitrous oxide can simultaneously flow into the engine intake, thereby increasing power output of the engine upon combustion. Releasing the power switch can cause both valves to close.

Figure 4:
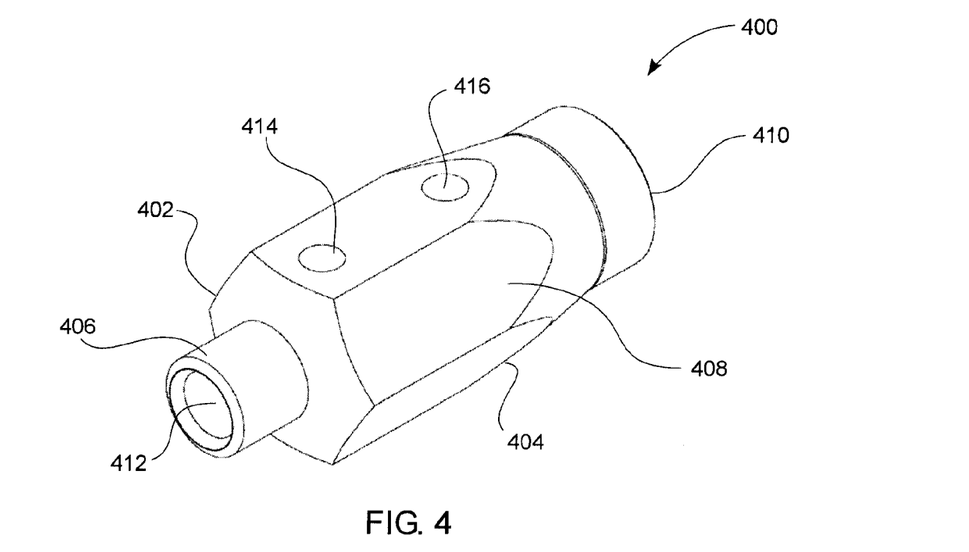
FIG. 4 is a perspective view of a nitrous oxide injection system nozzle, in accordance with another exemplary embodiment of the present inventions.

Illustrated in FIG. 4 is another exemplary embodiment of the present invention, in which the methanol valve can be disposed directly within the housing 402 of a nitrous oxide/methanol injection nozzle 400 (or nitrous oxide-powered methanol injector) attached to an engine intake or power cylinder, so as to simultaneously open the methanol valve and mix the supplemental methanol with the pressurized nitrous oxide as it is injected into the engine. As generally shown, the housing 402 can comprise a main body 404 for containing the methanol valve, a nozzle tip 406 for being operatively coupled or attached to the engine intake or cylinder, and a back cover 410 for allowing access to the internal workings of the injection nozzle 400. In one aspect of the present invention, the main body of the nozzle housing can be formed with wrench flats 408 which can conform to standard wrench sizes and facilitate installation and removal of the injection nozzle.

In addition to the backside opening which is covered by the back cover 410, the nozzle housing 402 can include a methanol inlet port 414 for coupling with a methanol line, a nitrous oxide inlet port 416 for coupling with a nitrous oxide flow line, and a nozzle exit 412 which can be centrally located within the nozzle tip 406. Optionally, the nozzle housing can also include a secondary fuel inlet port 415 for allowing secondary fuel to combine with the supplemental methanol prior to delivery into the engine intake (see FIG. 5).

In one aspect of the present invention, the main body 404 can be formed in the general shape of cylinder, with the nozzle tip 406 extending from an axial end of the cylinder and the nitrous oxide and methanol inlet ports formed through the sidewalls of the cylinder. The methanol inlet port can be located adjacent the nozzle tip end of the main body, while the nitrous oxide inlet port can be located towards the back cover end. It is to be appreciated, however, that other arrangements between the nozzle exit and the inlet ports are possible, including a non-cylindrical shape for the housing body.

Figure 5:
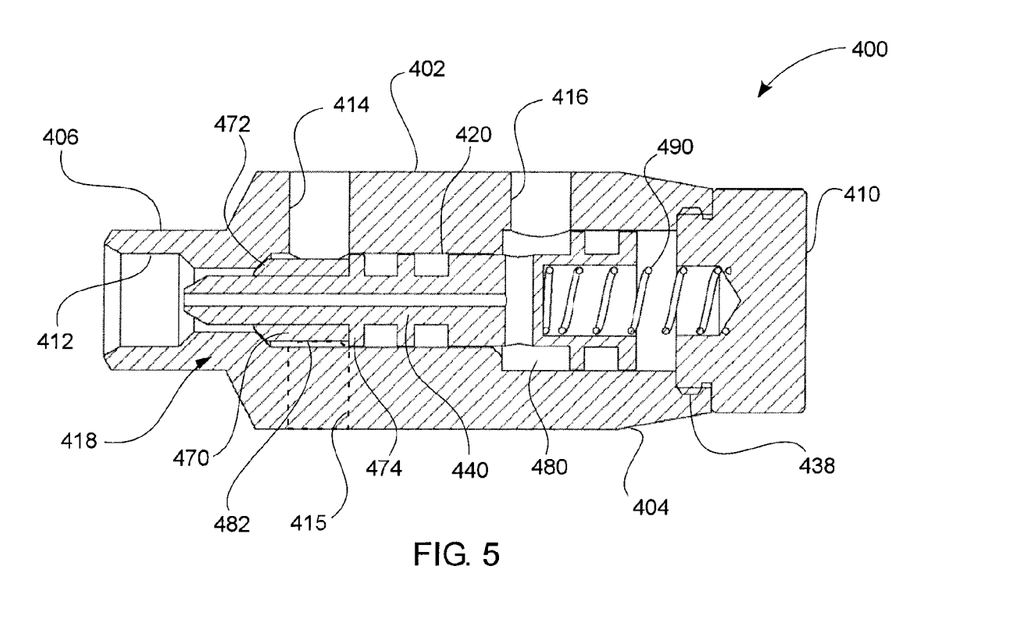
FIG. 5 is a cross-sectional view of the assembled nitrous oxide injection system nozzle of FIG. 4.

Illustrated in FIG. 5 are the internal workings of the methanol valve 418 disposed inside the injection nozzle 400. In the embodiment shown, the methanol valve/injection nozzle can generally comprise five components: the housing 402 having an internal axial bore 420, a ported spool piston 440, an annular needle seal or sealing device 470, a biasing device or spring 490, and the back cover 410. Together, the components can be configured to use the flow of pressurized nitrous oxide to concurrently open the methanol valve 418 and mix a flow of supplemental methanol (or supplemental methanol and secondary fuel) with the pressurized nitrous oxide during injection into the engine intake or power cylinder.

Figure 6:
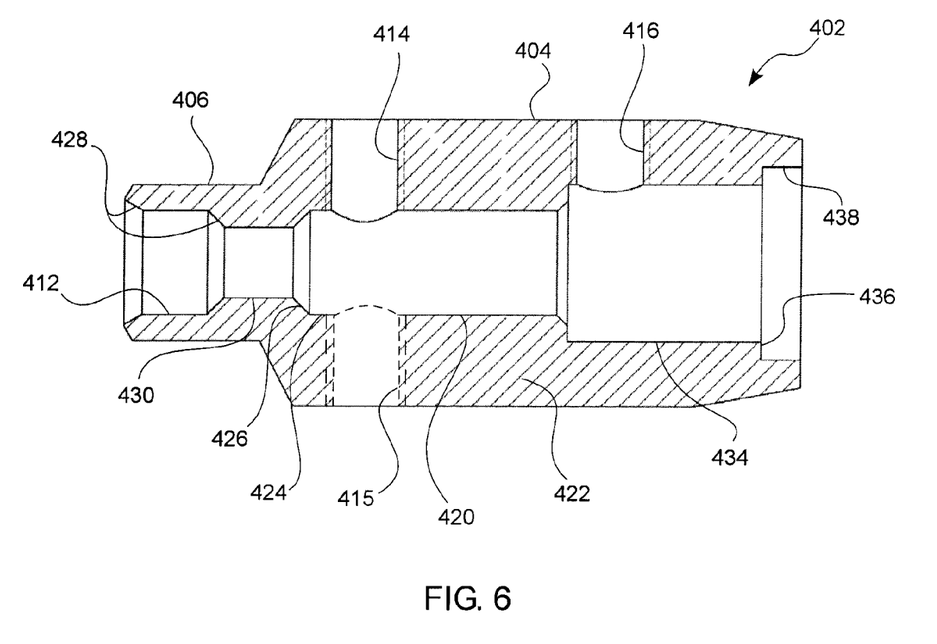
FIG. 6 is a cross-sectional view of the nozzle housing of FIG. 4.

A cross-sectional view of the housing 402 is shown in FIG. 6. The axial bore 420 can be formed along the center axis of the main body 404 of the housing 402. The axial bore can have sidewalls 422 with a stepped inner diameter, including a narrow bore region 424 proximate the nozzle end of the housing and a wider bore region 434 proximate the back end of the housing. Additionally, the narrow region 424 of the axial bore can have a chamfered transition surface 426 into the nozzle throat 430, leading to a diverging cone or cones 428 situated within the nozzle exit 412.

The axial bore 420 can further include a larger, backside opening 436 allowing access into the wider bore region 434 and configured with an attachment means, such as threaded joint 438 or post-and-groove joint, that can allow the back cover to be securely coupled to the nozzle housing 402 and remain connected when the nozzle fills with pressurized nitrous oxide.

The nitrous oxide inlet port 416 and methanol inlet port 414 can formed in the sidewalls 422 of the axial bore 420 to allow for the passage of the fluids into the methanol valve. In the embodiment shown, the methanol inlet port 414 can be located adjacent the nozzle end of the main body, with an opening into the narrow bore region 424 that is proximate the nozzle throat 430. The nitrous oxide inlet port 416 can be positioned further back along the main body 404, between the methanol inlet port 414 and the backside opening 436. In another aspect of the present invention, an optional secondary fuel inlet port 415 can also be located adjacent the nozzle end of the main body, at substantially the same axial location as the methanol inlet port 414.

Figure 7:
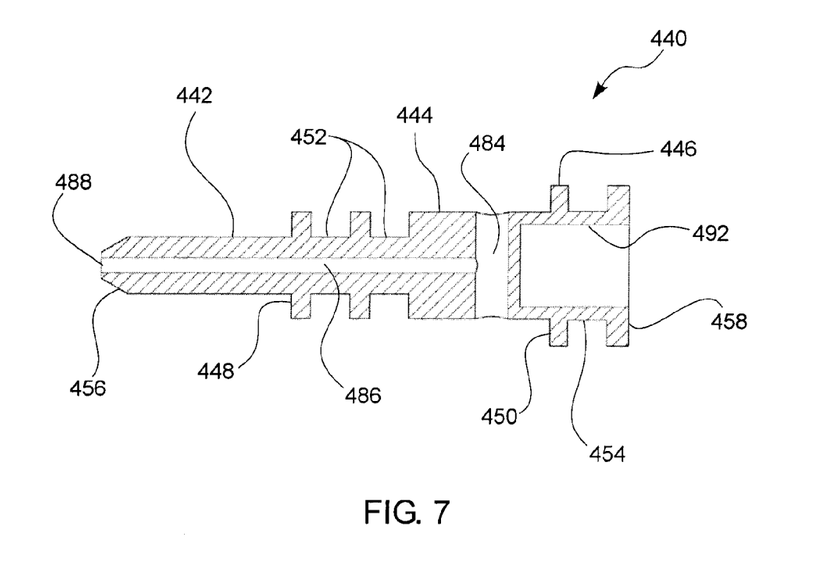
FIG. 7 is a cross-sectional view of the ported spool piston of FIG. 4.

As shown in FIGS. 5-7, the methanol valve 418 can further include the ported spool piston 440 which can be slidably inserted into the axial bore. The nozzle end of the ported spool piston can comprise a narrow needle portion 442 located adjacent the opening from the methanol inlet port and configured to fit inside the nozzle throat. The spool piston can also include a center portion 444 configured to slidably fit inside the narrow bore region, and a wider pressure-responsive portion 446 configured to slidably fit inside the wider bore region. Stepped transition surfaces 448, 450 can provide the boundary between the needle and center portions, and between the center and pressure-responsive portions, respectively. Furthermore, grooves 452, 454 for O-rings or similar sealing devices can also be formed in the center and pressure-responsive portions, to fluidly separate the nitrous oxide inlet port from the methanol inlet port, and the nitrous oxide inlet port from the backside face 458 of the ported spool piston.

The needle section 442 can include a pointed tip 456 which can project into the throat section of the axial bore. The annular needle seal 470 can be inserted over the needle section and abutted against the forward stepped transition surface 448. The needle seal can be elastomeric or deformable. The forward edge 472 of the needle seal can be angled to match the chamfered transition surface leading into the nozzle throat, so as to press against the chamfered surface and form a fluid-tight seal. Moreover, the needle seal 470 can positioned adjacent the methanol inlet port 414 to form an annular methanol chamber 480 bounded at the ends by the forward edge 472 of the needle seal at one end, and the forward stepped transition face 448 at the other.

In like fashion, the center portion of the ported spool valve can be positioned adjacent the nitrous oxide inlet port 416 to form an annular nitrous oxide chamber 482 bounded at the ends by the forward O-ring grooves 452 and the back stepped transition surface 450, which can also act as the pressure-responsive member slidably disposed within the wider bore region proximate the back end of the housing. Additionally, a backside pocket 492 can be formed into the backside face 458 of the ported spool piston 440 to accommodate a biasing device, such as a spring 490, which can bias the ported spool piston towards the nozzle end of the housing and seat the angled front edge 472 of the needle seal 470 against the chamfered transition surface 426 in the axial bore 420 when the injection nozzle is not in operation.

The ported spool piston 440 can have one or more radially transverse passages 484 formed in the center portion 444 and in fluid communication with the nitrous oxide chamber 482. The transverse passages can pass through the spool piston to connect with a central passage 486 formed along the axis of the ported spool piston. The central passage can have an exit opening 488 at the pointed tip 456 of the ported spool valve 456. Thus, the transverse and central passages can provide a direct fluidic connection between the nitrous oxide inlet port 416 and the nozzle throat 430.

The injection nozzle 400 can be operated in a manner similar to the operation of previously described embodiments. For example, a user can activate a control switch when a power boost is required or desired, causing a control valve to open and allowing a flow of pressurized nitrous oxide from the nitrous oxide flow line to reach the nitrous oxide inlet port 416, and pass into the nitrous oxide chamber 480. The pressurized nitrous oxide can act on the pressure responsive member 450 to overcome the biasing force provided by the biasing mechanism 490 and push the ported spool piston 440 towards the back cover 410 of the injection nozzle. Simultaneously, a portion of the flow of nitrous oxide can pass through the transverse and central passages 484, 486 of the ported spool piston and directed out the exit hole 488 and into the nozzle throat 430.

With the movement of the ported spool piston 440 towards the back of the nozzle body, the forward edge 472 of the needle seal 470 can lift off the chamfered transition surface 426 in the bore 420 and break the seal preventing the liquid methanol from flowing from the annular methanol chamber 480 into nozzle throat 430. This allows the flow of supplemental methanol to enter the nozzle throat and mix with the nitrous oxide as it travels through the throat and out the diverging cone section 428 of the nozzle exit. Moreover, the flowing pressurized nitrous oxide can create a venturi effect as it exits the tip opening 488 of the ported spool piston 440 and passes into the narrow throat of the nozzle, forming a low pressure region which can draw the liquid methanol from the methanol chamber 480 and methanol injection line. In one aspect of the present invention, the low-pressure venturi region in the throat of the nozzle can be sufficiently strong to draw the liquid methanol or water/methanol mixture from the methanol reservoir, through the methanol line and inlet port, and into the nozzle throat. This can allow for the source of methanol, such as the methanol reservoir, to be unpressurized.

In the embodiment that includes the optional secondary fuel inlet port 415, the movement of the ported spool piston 440 towards the back of the nozzle body can also allow a flow of secondary fuel to enter the nozzle throat and mix with both the supplemental methanol and nitrous oxide as it travels through the throat and out the diverging cone section 428 of the nozzle exit. In addition to combining the supplemental methanol with the secondary fuel, the NOS injection system can be selectable so that just one or the other of the external fuel sources is available for mixing with the nitrous oxide prior to delivery into engine intake. The injection nozzle can further be configured so that one or the other, or a controllable proportionate amount of the two liquid fuels, can be mixed together prior to combination with the nitrous oxide.

Releasing the control switch can cause the control valve to close, cutting off the flow of pressurized nitrous oxide into the injection nozzle and allowing the biasing mechanism 490 to push close the ported spool piston 440 and needle seal 470, sealing off the flow of supplemental methanol (and/or the secondary fuel) into the nozzle.

One benefit of the injection nozzle 400 having the methanol valve 418 disposed directly within the nozzle housing 402 is that the flowrate of the both nitrous oxide and supplemental methanol can be precisely controlled to allow correctly proportioned amounts of methanol and nitrous oxide to be injected simultaneously into the engine intake or power cylinder. The flowrate of the nitrous oxide can be controlled by prescribing the diameter of the transverse and central passages 484, 486, while the flowrate of the supplemental methanol can be controlled by prescribing the stiffness of the biasing device 490 and subsequent degree of movement of the ported spool piston with the axial bore 420 of the injection nozzle housing 402.

It can be appreciated that pre-mixing the supplemental methanol with the nitrous oxide simultaneously with injection into the engine intake, either upstream or downstream of the carburetor, or directly into the combustion chamber, etc. can allow for advantageous operation over prior art nitrous oxide systems. For instance, precisely controlling the mixing ratio between the nitrous oxide and the supplemental methanol at each injection nozzle allows the injection nozzle to bypass the engine's standard air/fuel intake system and be located in a variety of positions, including within the carburetor, downstream of the carburetor, or even directly into the head of the power cylinder.

Figure 8:
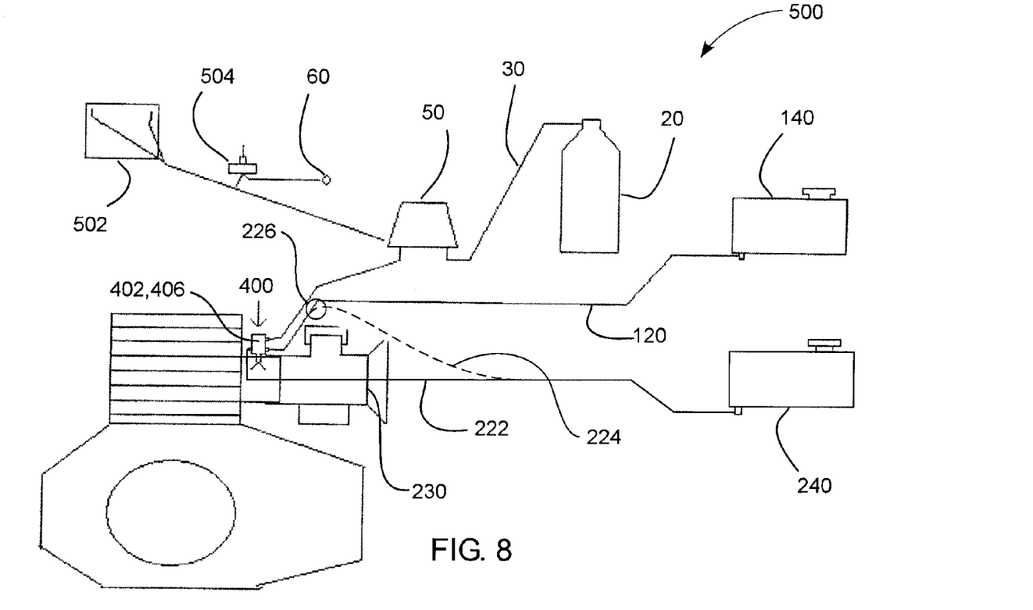
FIG. 8 is a schematic view of a nitrous oxide injection system in accordance with an exemplary embodiment of the present invention.

Referring to FIG. 8, a nitrous oxide/methanol injection system 500 is shown utilizing the nitrous oxide powered methanol injector 400 described above. The housing of the nozzle 402 or nozzle tip 406 can be directly coupled to an engine intake, such as downstream of the carburetor 230, as shown. The methanol injection line 120 can be coupled from the methanol reservoir 140 to the nozzle or injector 400. As described above, the supplemental methanol can comprise substantially pure methanol, a mixture of methanol and water, up to and including a 50/50 mixture of methanol and water, or a mixture of methanol, water and oil. Moreover, the supplemental methanol can be in liquid form and can be positively pumped to the intake of the engine with a methanol injection pump, or can be drawn to the engine intake via a low pressure suction means.

The nitrous oxide line 30 can also be coupled from the nitrous oxide bottle 20 to the nozzle or injector 400. The nitrous oxide control valve 50 can be coupled to the nitrous oxide line. The control switch 60 can activate the control valve 50, and can be coupled to a power source, such as battery 502. In one aspect of the present invention, a system power switch 504 can also be coupled to the battery and control switch.

As seen in FIG. 8, a secondary fuel line 222 can also be coupled between the fuel tank 240 and the injection nozzle 400, allowing secondary fuel to be mixed with the supplemental methanol and nitrous oxide in the injection nozzle. In an alternative embodiment, the secondary fuel line 224 can be combined with the methanol line 120 upstream of the engine intake and prior to the injection valve. In either setup, the system can further be configured so that one or the other, or a controllable proportionate amount of the two liquid fuels, can be mixed together prior to combination with the nitrous oxide. This can be accomplished at the methanol valve inside the injection nozzle, or upstream of the injection nozzle with a Y-coupler or mixing valve 226.

Figure 9:
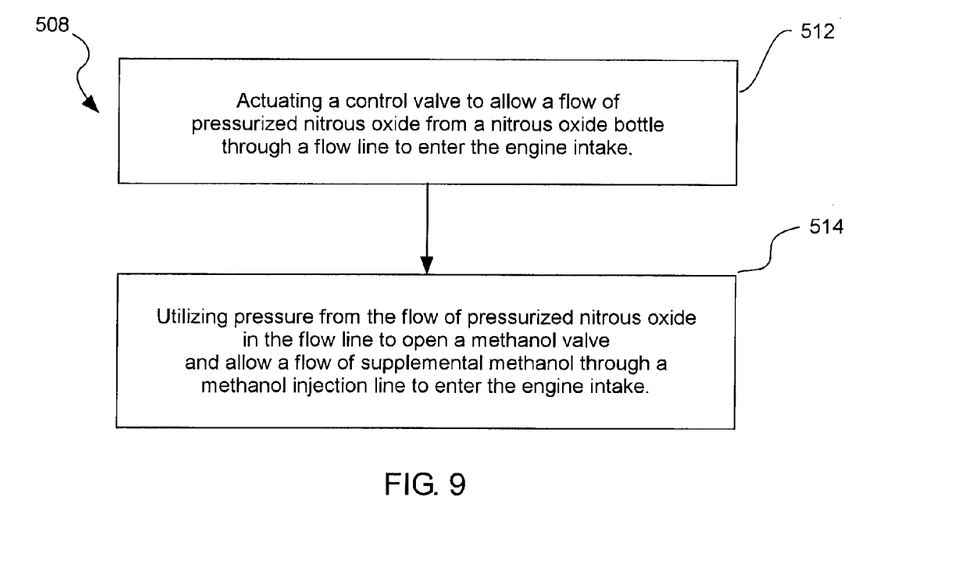
FIG. 9 is a flowchart depicting a method for increasing the power output of an internal combustion engine in response to adding nitrous oxide to an engine intake, according to an exemplary embodiment of the present invention.

As depicted in the flowchart of FIG. 9, the present invention can further comprise a method 508 for increasing the power output of an internal combustion engine in response to adding nitrous oxide to an intake of the engine. The method can include the operation of actuating 512 a control valve in a nitrous oxide flow line extending between a nitrous oxide bottle and the intake of the engine, to allow a flow of pressurized nitrous oxide from the nitrous oxide bottle through a flow line to enter the engine intake. An injection nozzle can be fluidly coupled to the nitrous oxide flow line and positioned in the engine intake, and configured to receive and direct the flow of pressurized nitrous oxide into the engine intake.

The method can further include the operation of utilizing 514 the pressure from the flow of pressurized nitrous oxide in the flow line to open a methanol valve and allow a flow of supplemental methanol from a methanol injection line (and/or a flow of secondary fuel from a secondary fuel line) to enter the engine intake, to provide a flow of supplemental methanol (and/or secondary fuel) in addition to the flow of primary fuel.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A nitrous oxide injection system for an internal combustion engine, comprising:
    a) a source of pressurized nitrous oxide;
    b) a nitrous oxide flow line, in fluid communication with the source of pressurized nitrous oxide;
    c) an injection nozzle, in fluid communication with the nitrous oxide flow line and configured to be operatively coupled to an engine intake;
    d) a control valve fluidly coupled to the nitrous oxide flow line for allowing a flow of pressurized nitrous oxide to the injection nozzle;
    e) a methanol injection line, configured to be in fluid communication with a source of supplemental methanol and the engine intake, for providing supplemental methanol for injection into the engine intake;
    f) a methanol valve, fluidly coupled to the methanol injection line and operably coupled to the nitrous oxide flow line, the methanol valve being responsive to a flow of pressurized nitrous oxide through the nitrous oxide flow line to allow a flow of supplemental methanol to the engine intake;
    g) the injection nozzle being configured to simultaneously combine and deliver the flow of pressurized nitrous oxide and the flow of supplemental methanol into the engine intake; and
    h) the methanol valve further comprising a ported spool piston for generating a venturi jet to draw the flow of supplemental methanol from the methanol injection line in response to the flow of pressurized nitrous oxide into the nozzle.

2. The nitrous oxide injection system of claim 1, wherein the supplemental methanol for injection into the engine intake further comprises a water/methanol mixture.

3. The nitrous oxide injection system of claim 1, wherein the ported spool piston is movably disposed in a housing and has a closed position that restricts the flow of supplemental methanol through the methanol valve and an open position that allows the flow of supplemental methanol through the methanol valve.

4. The nitrous oxide injection system of claim 3, wherein the spool piston divides the housing into a nitrous oxide chamber and a methanol chamber, wherein a portion of the flow of pressurized nitrous oxide is receivable in the nitrous oxide chamber to move the spool piston to the open position to allow the flow of supplemental methanol through the methanol chamber.

5. The nitrous oxide injection system of claim 3, further comprising a biasing device coupled to the spool piston and biasing the spool piston towards the closed position.

6. The nitrous oxide injection system of claim 1, wherein the injection system is configured to combine a flow of secondary fuel with the flow of supplemental methanol prior to delivery into the engine intake.

7. The nitrous oxide injection system of claim 1, further comprising a control switch operatively coupled to the control valve to selectively allow the flow of pressurized nitrous oxide to the injection nozzle.

8. The nitrous oxide injection system of claim 1, wherein the injection nozzle is operatively coupled to the engine intake at a location selected from the group of locations consisting of an air box, an inlet portion of a carburetor, an outlet portion of a carburetor and a power cylinder.

9. The nitrous oxide injection system of claim 1, wherein the source of pressurized nitrous oxide further comprises a pressurized bottle of compressed nitrous oxide liquid.

10. A nitrous oxide injection system for combining nitrous oxide and methanol prior to injection into an internal combustion engine, comprising:
    an injection nozzle having an axial bore bounded by sidewalls, a nitrous oxide inlet port, a methanol inlet port, a nozzle exit operatively coupled to an engine intake, and containing a methanol valve therein, the methanol valve being configured to open in response to a flow of pressurized nitrous oxide into the nozzle;
    a nitrous oxide flow line, in fluid communication with the nitrous oxide inlet port and configured to be coupled with a source of pressurized nitrous oxide;
    a methanol line, in fluid communication with the methanol inlet port and configured to be coupled with a source of methanol, for providing a flow of supplemental methanol for injection into the engine intake;

a control valve fluidly coupled to the nitrous oxide flow line between the injection nozzle and the source of pressurized nitrous oxide, wherein activating the control valve allows the flow of pressurized nitrous oxide into the nozzle to open the methanol valve and combine with the flow of supplemental methanol prior to injection into the internal combustion engine; and the injection nozzle further comprising a secondary fuel inlet port extending through the sidewalls and entering the axial bore adjacent the nozzle exit.

11. The nitrous oxide injection system of claim 10, wherein the flow of supplemental methanol for injection into the engine intake further comprises a water/methanol mixture.

12. The nitrous oxide injection system of claim 11, wherein:

axial bore is closed at one end and open at the other end to form the nozzle exit; and the methanol valve disposed within the axial bore further comprising a ported spool piston for generating a venturi jet to draw the flow of supplemental methanol from the methanol line in response to a flow of pressurized nitrous oxide into the nozzle.

13. The nitrous oxide injection system of claim 12, further comprising:

the methanol inlet port extending through the sidewalls and entering the axial bore adjacent the nozzle exit;

the nitrous oxide inlet port extending through the sidewalls and entering the axial bore adjacent the closed end; and the ported spool piston moveably disposed within the axial bore, comprising:

a needle valve portion adjacent the nozzle exit to seal the methanol inlet port in the closed position;

a biasing means to bias the ported spool piston into the closed position in the absence of the flow of pressurized nitrous oxide;

a pressure responsive member adjacent the closed end of the axial bore for moving the ported spool piston within the axial bore and opening the needle valve portion in response the flow of pressurized nitrous oxide; and a central passage formed in the ported spool piston to allow the flow of pressurized nitrous oxide from the nitrous oxide inlet port, through the ported spool piston and out the nozzle exit.

14. The nitrous oxide injection system of claim 10, wherein the injection nozzle is operatively coupled to the engine intake at a location selected from the group of locations consisting of an air box, an inlet portion of a carburetor, an outlet portion of a carburetor and a power cylinder.

15. The nitrous oxide injection system of claim 10, wherein the source of pressurized nitrous oxide further comprises a pressurized bottle of compressed nitrous oxide liquid.

16. A nitrous oxide injection system for an internal combustion engine, comprising:

a) a source of pressurized nitrous oxide;

b) a nitrous oxide flow line, in fluid communication with the source of pressurized nitrous oxide;

c) an injection nozzle, in fluid communication with the nitrous oxide flow line and configured to be operatively coupled to an engine intake;

d) a control valve fluidly coupled to the nitrous oxide flow line for allowing a flow of pressurized nitrous oxide to the injection nozzle;

e) a methanol injection line, configured to be in fluid communication with a source of supplemental methanol and the engine intake, for providing supplemental methanol for injection into the engine intake;

f) a methanol valve, fluidly coupled to the methanol injection line and operably coupled to the nitrous oxide flow line, the methanol valve being responsive to a flow of pressurized nitrous oxide through the nitrous oxide flow line to allow a flow of supplemental methanol to the engine intake;

g) the injection nozzle being configured to simultaneously combine and deliver the flow of pressurized nitrous oxide and the flow of supplemental methanol into the engine intake; and h) the injection system being configured to combine a flow of secondary fuel with the flow of supplemental methanol prior to delivery into the engine intake.

17. The nitrous oxide injection system of claim 16, wherein the supplemental methanol for injection into the engine intake further comprises a water/methanol mixture.

18. The nitrous oxide injection system of claim 16, wherein the methanol valve further includes a spool piston movably disposed in a housing and having a closed position that restricts the flow of supplemental methanol through the methanol valve and an open position that allows the flow of supplemental methanol through the methanol valve.

19. The nitrous oxide injection system of claim 18, wherein the spool piston divides the housing into a nitrous oxide chamber and a methanol chamber, wherein a portion of the flow of pressurized nitrous oxide is receivable in the nitrous oxide chamber to move the spool piston to the open position to allow the flow of supplemental methanol through the methanol chamber.

20. The nitrous oxide injection system of claim 18, further comprising a biasing device coupled to the spool piston and biasing the spool piston towards the closed position.

21. The nitrous oxide injection system of claim 16, wherein the methanol valve further comprises a ported spool piston for generating a venturi jet to draw the flow of supplemental methanol from the methanol injection line in response to the flow of pressurized nitrous oxide into the nozzle.

22. The nitrous oxide injection system of claim 16, further comprising a control switch operatively coupled to the control valve to selectively allow the flow of pressurized nitrous oxide to the injection nozzle.

23. The nitrous oxide injection system of claim 16, wherein the injection nozzle is operatively coupled to the engine intake at a location selected from the group of locations consisting of an air box, an inlet portion of a carburetor, an outlet portion of a carburetor and a power cylinder.

24. The nitrous oxide injection system of claim 16, wherein the source of pressurized nitrous oxide further comprises a pressurized bottle of compressed nitrous oxide liquid.

25. A nitrous oxide injection system for combining nitrous oxide and methanol prior to injection into an internal combustion engine, comprising:

an injection nozzle having a nozzle housing with an axial bore bounded by sidewalls, a nitrous oxide inlet port, a methanol inlet port, the axial bore being closed at one end and open at the other end to form a nozzle exit operatively coupled to an engine intake, and containing a methanol valve disposed within the axial bore and including a ported spool piston configured to open and generate a venturi jet to draw the flow of supplemental methanol from the methanol line in response to a flow of pressurized nitrous oxide into the nozzle;

a nitrous oxide flow line, in fluid communication with the nitrous oxide inlet port and configured to be coupled with a source of pressurized nitrous oxide;

a methanol line, in fluid communication with the methanol inlet port and configured to be coupled with a source of water/methanol mixture, for providing a flow of supplemental water/methanol mixture for injection into the engine intake;

a control valve fluidly coupled to the nitrous oxide flow line between the injection nozzle and the source of pressurized nitrous oxide, wherein activating the control valve allows the flow of pressurized nitrous oxide into the nozzle to open the methanol valve and combine with the flow of supplemental methanol prior to injection into the internal combustion engine.

* * * * *